Nov. 24, 1970     J. F. DEFFENBAUGH ET AL     3,542,994
ARC GAP CONTROL APPARATUS FOR FLASH WELDING
Filed Sept. 4, 1968                                 4 Sheets-Sheet 1
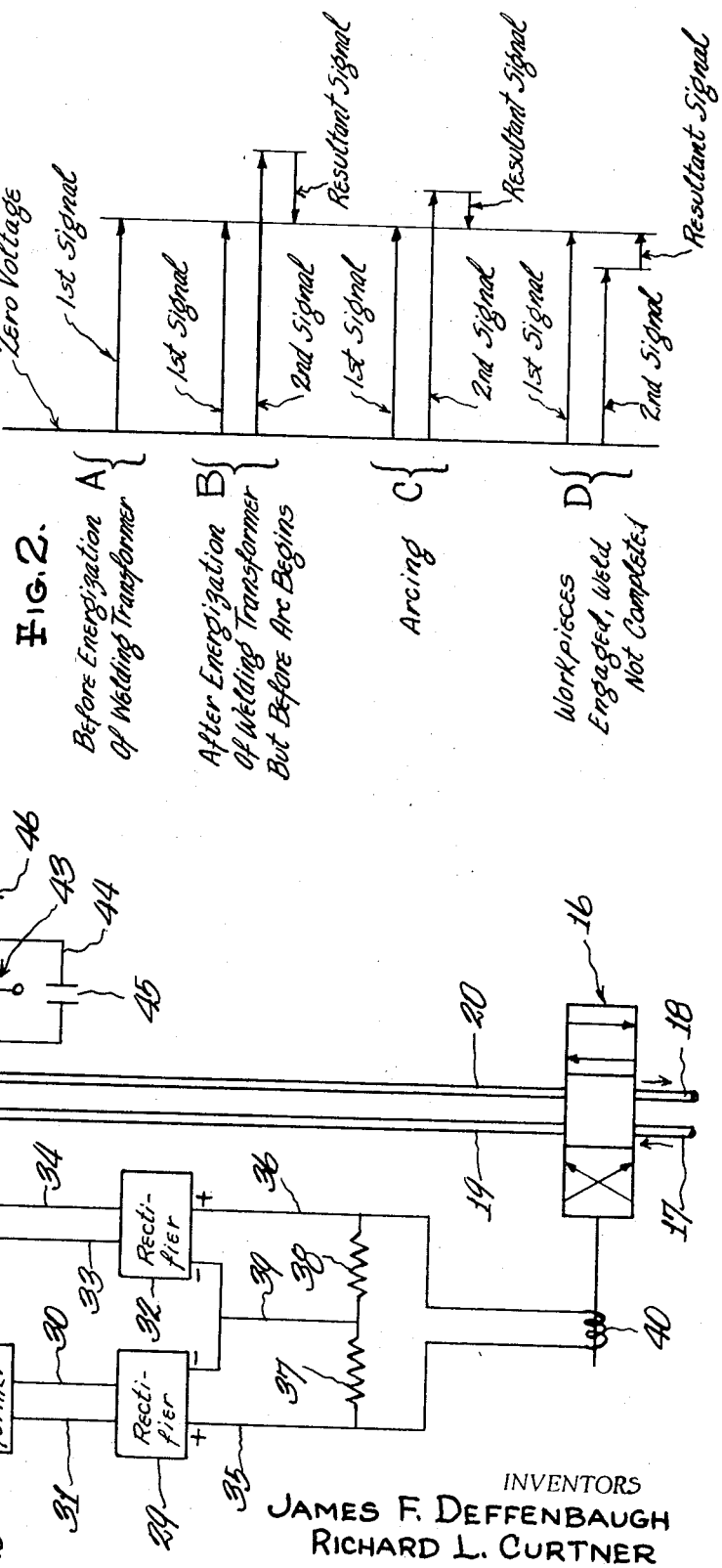
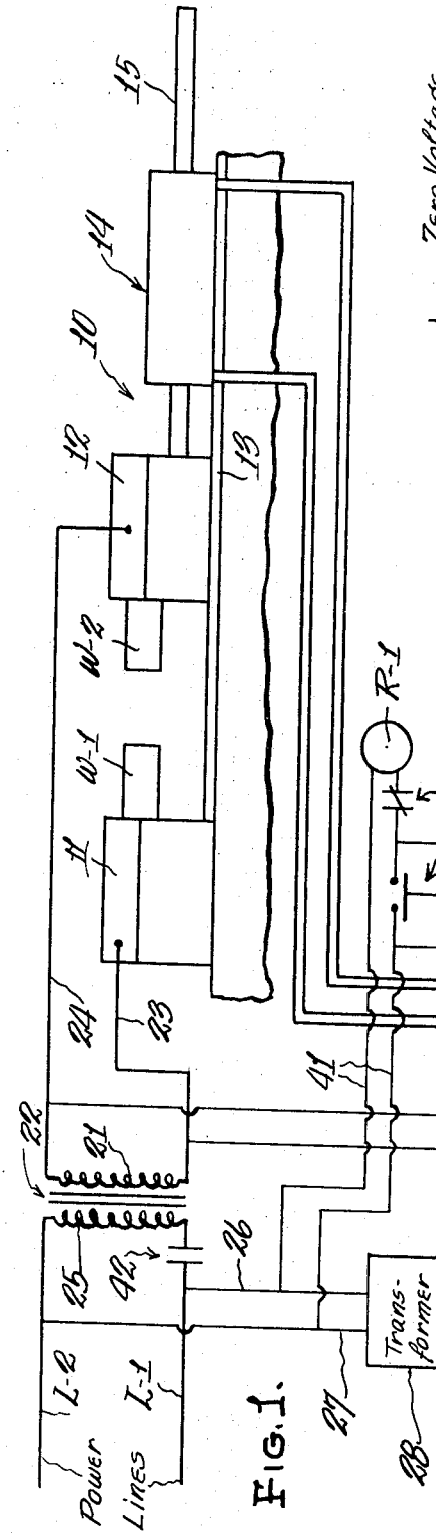
INVENTORS
JAMES F. DEFFENBAUGH
RICHARD L. CURTNER
BY *Williams and Kreske*
ATTORNEYS

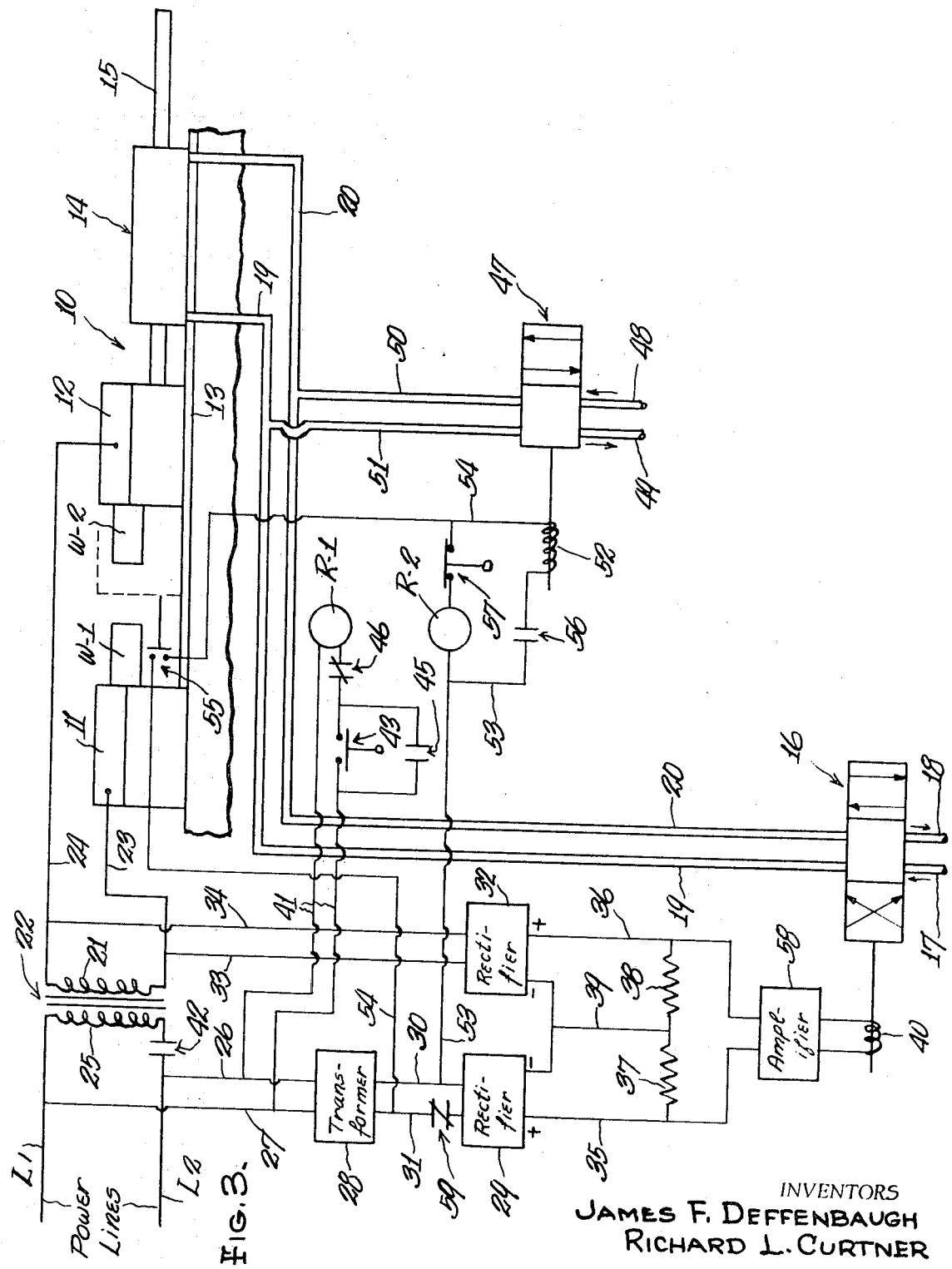

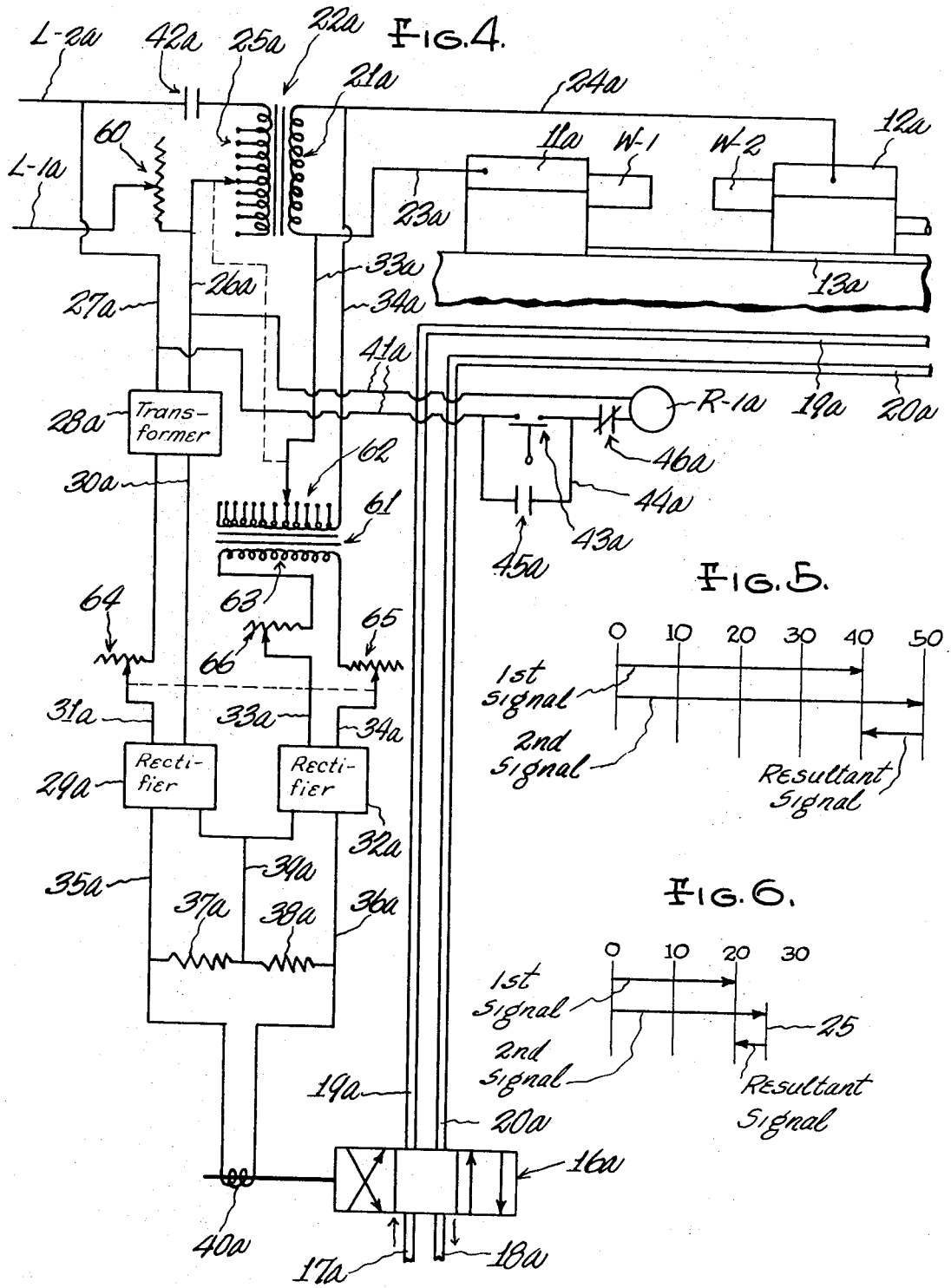

though this application Sept. 4, 1968, Ser. No. 757,334

United States Patent Office 3,542,994
Patented Nov. 24, 1970

3,542,994
ARC GAP CONTROL APPARATUS FOR
FLASH WELDING
James F. Deffenbaugh, Warren, and Richard L. Curtner, Youngstown, Ohio, assignors to The McKay Machine Company, Youngstown, Ohio
Continuation-in-part of application Ser. No. 604,715, Dec. 27, 1966. This application Sept. 4, 1968, Ser. No. 757,334
Int. Cl. B23k *11/04*
U.S. Cl. 219—97      4 Claims

ABSTRACT OF THE DISCLOSURE

An arc-gap-dimension control apparatus for flash welding employing a servomechanism controlled by a reference-voltage signal derived from the input line voltage and an opposing voltage-signal derived from the arc gap. A pair of ganged rheostats, one in series with each voltage signal, is employed to vary the sensitivity of the control. A tapped-primary power transformer varies the welding voltage, and its control is ganged with the control of a second tapped-primary transformer in the gap-voltage-sensing circuit to compensate for a voltage change in the gap signal caused by voltage-output adjustment of the power transformer.

Figure 7:
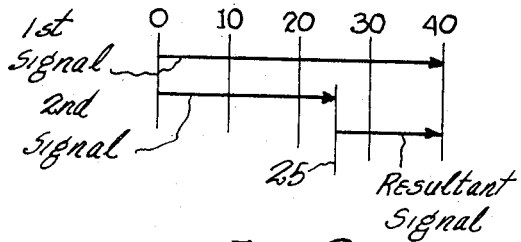

This application is a continuation-in-part of now-abandoned application Ser. No. 604,715, filed Dec. 27, 1966, and assigned to the assignee of this application.

In flash welding, a high intensity welding current is caused to arc between a pair of juxtapositioned workpieces to be welded until they soften and such workpieces are then forced together for fusion. In order to develop an optimum arc, the spacing between the workpieces must be maintained within rather narrow limits and, since the arc burns the adjacent workpiece margins away, the workpieces must be slowly moved toward each other during arcing to maintain the proper spacing therebetween.

In the past, movement of the workpieces toward each other during arcing to maintain the optimum spacing therebetween was programmed into the welding apparatus. This has conveniently been accomplished by relatively moving the workpieces directly by a cam or by using a cam indirectly to actuate a servo valve which in turn controlled operation of a fluid motor which effected workpiece movement. In any event, unless all variables were properly accounted for, less than optimum results were obtained. Since some variables cannot wholly be anticipated, such as line voltage fluctuations, perfect welds are frequently more of an art than a science.

The present invention, by means of a novel approach, provides methods and apparatus for flash welding which virtually insures perfect results without trial and error notwithstanding the many variables of workpiece size, composition, line voltage, and the like. This is done in a most simple, efficient and low cost manner well-suited for high-speed production under the most severe operating conditions. These and other advantages will readily become apparent from a study of the following description and from the appended drawings.

In the drawings accompanying this application and forming a part of this specification there is shown, for purpose of illustration an embodiment which the invention may assume, and in these drawings:

FIG. 1 is a simplified diagrammatic view of apparatus embodying the invention,

FIG. 2 is a diagram wherein certain electrical signals are shown as vector quantities, FIG. 3 is a view similar to FIG. 1 but showing the apparatus of the invention in greater detail, FIG. 4 is a fragmentary diagrammatic view similar to FIG. 1 but showing additional apparatus found to be desirable in commercial application of the invention, and FIGS. 5 through 13 are diagrams wherein certain electrical signals are shown as vector quantities.

DETAILED DESCRIPTION

With reference to FIG. 1, there is diagrammatically shown welding apparatus 10 formed of a fixed jaw 11 for gripping a workpiece W–1 and a movable jaw 12 for gripping a workpiece W–2. Jaw 12 is mounted for movement toward and away from jaw 11 and is electrically insulated therefrom as by insulation 13 interposed between jaw 12 and the ways along which it is slidable. The means presently disclosed for effecting movement of jaw 12 comprises a fluid cylinder 14 of the type having a piston rod 15 extending from opposite ends thereof whereby the piston of such cylinder, under given conditions of fluid flow and pressure, will exert the same force and will operate at the same speed in either direction of piston movement. Cylinder 14 is preferably insulated from jaw 11 in the same manner as jaw 12 and one end of piston rod 15 is suitably connected to the jaw 12 to effect movement thereof toward and away from the jaw 11 depending upon flow of pressurized fluid to such cylinder.

The means provided for controlling flow of fluid to cylinder 14 comprises a four-way servo valve 16. An inlet conduit 17 connects valve 16 to a source. A conduit 19 connects the valve 16 to the left end of cylinder 14 while a conduit 20 connects the valve with the right end of the cylinder.

With the valve 16 in its centered or neutral position shown, pressurized fluid can not flow to either end of cylinder 14 nor can fluid escape from either end thereof. If, however, the internal parts of valve 16 are shifted in one direction by means later to be disclosed, pressurized fluid will flow from conduit 17 to the left end of cylinder 14 via conduit 19 while exhausted fluid may flow from the right end of cylinder 14 to conduit 18 via conduit 20. This will, of course, shift piston rod 15 to the right. On the other hand, if the internal parts of valve 16 are shifted in the opposite direction, pressurized fluid will flow from conduit 17 to the right end of cylinder 14 via conduit 20 while exhausted fluid may flow from the left end of the cylinder to conduit 18 via conduit 19. This will shift piston rod 15 to the left.

Since the workpieces W–1, W–2 respectively, clamped in jaws 11, 12 are adapted to be heated to welding temperature by causing a heavy current to arc between the workpieces, jaws 11 and 12 are disposed in the secondary 21 of a suitable transformer 22 by respective circuit branches 23, 24. The primary 25 of transformer 22 is adapted to be connected to power lines L–1, L–2.

Connected to A.C. power lines L–1 and L–2, by means of lines 26, 27 is a transformer 28 which is in turn connected to a rectifier 29 by lines 30, 31. Another rectifier 32 is connected to the welding circuit branches 23, 24 by lines 33, 34. One of the output terminals of rectifier 29, for example, the positive terminal thereof, is connected to the positive terminal of the rectifier 32 by means of lines 35, 36. A pair of resistors 37, 38 are disposed in series between the lines 35, 36 and a line extends from between the resistors 37, 38 to the negative output terminals of rectifiers 29, 32. In shunt relation with the resistors 37, 38 is a solenoid actuator 40 for the servo valve 16. As will later be disclosed, when current flows in one direction through solenoid 40, valve 16 will cause fluid to flow in one direction to cylinder 14. Conversely, when current flows in the opposite direction through solenoid 40, the valve will cause fluid to flow in the opposite direction to the cylinder.

In order to selectively energize the welding transformer 22, a relay R-1 is connected between the lines 26, 27 via a circuit 41. Normally open contacts 42 are interposed in line L-1 as shown and are adapted to close upon energization of R-1. Interposed in circuit 41 is a normally open, momentary contact switch 43 and a holding circuit 44 shunts around switch 43 and contains normally open contacts 45 which close when relay R-1 is energized. Also interposed in circuit 41 are relay contacts 46; however, since such contacts are normally closed and are adapted to open upon energization of a relay later to be disclosed, they may be ignored for the moment. Before describing operation of the apparatus thus far disclosed, operation of the circuits provided by lines 35, 36 and 39, and by the components 37, 38 and 40 will be related:

With identical output voltages from rectifiers 29, 32 and assuming identical resistances 37, 38, the same potential, say 6 volts, will exist across the lines 35, 39 and across the lines 36, 39. Accordingly, with no difference in potential existing between the lines 35 and 36, no current will flow through the actuator 40 shunted across these lines.

If it now be assumed that the voltage across lines 36, 39 has decreased to, say 4 volts, while the voltage across lines 35, 39 remains at 6 volts, a difference in potential of 2 volts exists between the lines 35, 36. Current will thus flow in one direction through the actuator 40 to thereby shift the valve 16 in one direction.

Upon an increase of voltage across lines 36, 39, to say 8 volts, while the voltage across lines 35, 39 remains the same, a 2 volt difference in potential will again exist between the lines 35, 36. Current will now, however, flow in the opposite direction through the actuator 40 to thus shift the valve 16 in the opposite direction.

Obviously upon return of voltage across lines 36, 39 to 6 volts while the voltage across lines 35, 39 remains unchanged, current will cease to flow in actuator 40 and thus valve 16 will return to its neutral position shown.

Assuming that the workpieces W-1, W-2 have been suitably gripped in respective jaws 11 and 12, the connection of lines L-1, L-2 to a source of electrical energy will cause a D.C. potential of, for example, 6 volts (hereinafter referred to as a first electrical signal) to exist between the output terminals of rectifier 29. Although no potential exists at this time across the output terminals of rectifier 32, there will, however, be a potential across the lines 35, 36 since the later is connected to the negative output terminal of the rectifier 29 via the resistor 38 and the line 39. Thus, current will flow in the shunt-connected actuator 40 to shift the valve 16 in a direction to cause fluid under pressure to flow to the left end of cylinder 14 to thus forceably maintain the movable jaw 12 in its retracted position shown. This situation is illustrated at A in FIG. 2.

When the welding operation is to be initiated, switch 43 will momentarily be closed to energize relay R-1. This will close the contacts 45 in shunt circuit 44 to retain R-1 energized after the switch 43 is released. Energization of R-1 will also close contacts 42 in line L-1 to energize the welding transformer 22. An electrical potential will now exist across the lines 23, 24; however, since the workpieces are spaced-apart a considerable distance, no arc will be drawn between the workpieces at this time. Since the rectifier 32 is connected across the lines 23, 24, a D.C. potential of, for example, 10 volts (hereinafter referred to as a second electrical signal), is caused to exist between the output terminals of the rectifier 32. Since the voltage across the lines 36, 39 is greater than that across the lines 35, 39, current flows through the actuator 40 in the opposite direction from that before described to shift the valve in a direction to cause flow of pressurized fluid to the right-hand end of cylinder 14. This situation is illustrated in FIG. 2 at B. With fluid under pressure admitted to the right-hand end of cylinder 39 and with fluid exhausted, of course, from the left-hand end thereof, the jaw 12 and its workpiece W-2 will be shifted to the left toward workpiece W-1.

When the gap between the workpieces W-1, W-2 becomes small enough to permit the welding current to arc therebetween, there will be a voltage drop across the lines 23, 24, which will be reflected as a proportional voltage drop across the lines 36, 39. Accordingly, current will still flow through actuator 40 in the same direction as just above described. (see FIG. 2 at C); however, since the second signal is now less than before but still greater in voltage than the first signal, valve 16 will continue to feed pressurized fluid to the right-hand end of cylinder 14 but at a reduced rate to reduce the speed at which jaw 12 moves workpiece W-2 toward workpiece W-1.

In the event the workpieces are so close together as to reduce the arc below optimum or to even extinguish it, the voltage across lines 23, 24 will still further drop and the voltage across lines 36, 39 will fall below that across lines 35, 39. With the first signal voltage greater than that of the second signal voltage (see D in FIG. 2), current will flow in a reverse direction through the actuator 40 to feed fluid under pressure to the left-hand end of cylinder 14 to move the workpiece W-2 away from workpiece W-1. As soon as the gap between the workpieces becomes great enough to once again increase the voltage of the second signal above that of the first signal, movement of the workpieces toward each other will be resumed.

Although not shown in FIG. 2, whenever the voltage of the second signal equals that of the first signal, no current will flow through the actuator 40 and thus valve 16 will be in its neutral position shown wherein the piston rod of cylinder 14 will be locked against movement in either direction.

It is to be understood that as the welding current arcs between the workpieces, adjacent workpiece portions are burnt away thus tending to increase the gap therebetween. As hereinabove described, however, the workpiece W-2 will be continually advanced to maintain optimum arcing between the workpieces.

An important feature of the invention is that the present apparatus is self-compensating for fluctuations in voltage across the power lines L-1, L-2. This results because of the fact that while the first signal is proportional to the voltage across L-1, and L-2 and the second signal is proportional to the voltage across lines 23, 24, the voltage across lines 23, 24 is also proportional to the voltage across lines L-1 and L-2. For example, should the voltage across L-1 and L-2 momentarily decrease thus causing a decrease in the voltage of the first-signal, the voltage of the second signal will also decrease in proportion thereto. A proportionate decrease in voltage between the first and second signals will reduce the voltage differential therebetween and thus desirably slow operation of the cylinder 14 to compensate for reduced arcing between the workpieces as a result of lower voltage. Note that while operation of the cylinder will be slowed, it will not otherwise be affected. Obviously, in the event of a momentary increase in voltage across lines L-1, L-2, the effect will be to speed up operation of the cylinder without otherwise affecting its operation.

When the workpieces W-1, W-2 have been heated to welding temperature by the arcing of welding current therebetween as hereinabove described, such workpieces will be fused or forged together by quickly and forceably pushing them together until they cool. In theory, the valve 16 could be employed to so feed pressurized fluid to the cylinder 14 that the workpiece W-2 will be forced to engagement with the workpiece W-1. As a practical matter, however, in order for valve 16 to carry out the above-described delicate control of workpiece movement during arcing, such valve will be of too small a capacity to effectuate the required rapid movement of the workpieces during forging. To carry out the foregoing forging operation, additional structure shown in FIG. 3 is therefore preferably employed.

As seen in FIG. 3, a high flow capacity fluid control valve 47 has a fluid inlet conduit 48, a fluid return conduit 49, and outlet conduits 50, 51. Conduit 50 is connected to the conduit 20 which leads to the right end of cylinder 14 while conduit 51 is connected to the conduit 19 which leads to the left end of cylinder 14. An electrical actuator 52 of valve 47 is connected across the lines 30, 31 by lines 53, 54. Interposed in line 54 are the normally open contacts of a limit switch 55 and interposed in the line 53 are the normally open contacts 56 of a relay R-2 which is shunted across the actuator 52 and the contacts 56. Relay R-2 not only controls the contacts 56, it also controls the normally closed contacts 46 previously described as being in series with the relay R-1. In series with the relay R-2 is a normally closed push button switch or the like 57. Completing the additional structure seen in FIG. 3, a suitable amplifier 58 is shown in circuit with the valve actuator 40 of the valve 16 whereby the previously described electrical signal fed to the actuator 40 may be increased in strength to obtain the desired valve operation. It will be appreciated that by merely adjusting the gain of amplifier 58, the degree of response of valve 16 to a given electrical signal in the shunt circuit across the lines 35, 36 is easily adjusted.

Assuming that flashing is taking place between the workpieces W-1, W-2 as previously described, the jaw 12 will eventually reach its dashed position shown wherein it engages the actuator of limit switch 55 and closes its contacts in line 54. It will be assumed that with the jaw 12 in this position the workpieces have achieved welding temperature.

Upon closing of the contacts of limit switch 55 relay R-2 will be energized to open its normally closed contacts 46 and thus de-energize the relay R-1. This will open the contacts 42 in power line L-1 thus de-energizing the welding transformer 22. The energization of relay R-2 will not only open the contacts 46, it will also close the contacts 56 to energize the solenoid actuator 52 of valve 47 to shift it from the normal position shown wherein all of the connected conduits are closed off from each other to a position wherein conduit 48 is in communication with conduit 50 and conduit 49 is in communication with conduit 51. Finally, energization of relay R-2 opens a set of normally closed contacts 59 interposed in the line 31 between the transformer 28 and the rectifier 29 to de-energize the actuator 40 of valve 16 so that the latter remains in its neutral position illustrated.

With valve 47 shifted to quickly feed pressurized fluid to conduit 20 and to return exhausted fluid from conduit 19, cylinder 14 will quickly force jaw 12 to the left thus forging the workpieces together. In a few moments, the workpieces will cool and harden whereupon button 57 may be pressed to open its normally closed contacts.

The opening of contacts 57 will de-energize relay R-2 to open the contacts 56 and close the contacts 46, 59. Since push button contacts 43 are open, the closing of contacts 46 will not energize relay R-1; however, the closing of contacts 59 will cause current to flow once again to the solenoid actuator 40 of valve 16 to provide the previously described first signal illustrated at A in FIG. 2. Assuming that at least one of the jaws 11, 12 have been opened to release its workpiece, jaw 12 will be shifted to the right toward its illustrated full line position. When jaw 12 has moved far enough to open the contacts of limit switch 55, button 57 may be released whereupon jaw 12 will continue to move to the right until it reaches its illustrated, full-line position. The forged-together workpieces may now be removed from the jaws 11, 12 and the operation then repeated with another pair of workpieces.

While the construction thus far described functions quite well, it hase been found desirable to incorporate certain additional components for purpose of increasing the flexibility of the invention under extreme operating conditions and for use with widely differing workpieces.

With reference to FIG. 4 wherein parts corresponding to those hereinbefore disclosed are identified with the same reference characters as before but with the suffix a added, it is to be noted that the primary 25a of the welding transformer 22a is provided with taps whereby its ratio with the secondary 21a may be adjusted to thus vary the output voltage of the secondary in accordance with the size and type of workpieces being welded. In series with the welding transformer primary 25a is a variable resistance 60 for reducing the voltage supplied to the welding transformer primary by the power lines L-1a, L-2a. For convenience, contacts 42a are herein shown interposed in power line L-2a rather than in L-1a.

Interposed in the lines 33a, 34a which power the rectifier 32a is a transformer 61 whose primary 62 is provided with taps whereby its ratio with its secondary 63 may be adjusted to thus vary the output voltage of such secondary to the rectifier 32a. For a purpose to appear, the tap switch of welding transformer 22a is connected to that of transformer 61 so that when the welding transformer output is decreased by use of the tap switch, the output of transformer 61 is proportionally increased. Similarly, when the output of the welding transformer is increased, the output of transformer 61 will be proportionally decreased.

Interposed in line 31a between the transformer 28a and the rectifier 29a is a variable resistance 64 for adjusting the voltage across the lines 31a, 30a. Similarly, a variable resistance 65 is interposed in line 34a intermediate the transformer 61 and the rectifier 32a for adjusting the voltage across the lines 33a, 34a. As illustrated, the operators of variable resistances 64, 65 are connected together for simultaneous operation whereby the voltages across lines 30a, 31a and 33a, 34a may be simultaneously increased or decreased by the same magnitude. Finally, there is interposed in line 33a a variable resistance 66 whereby the voltage across lines 33a, 34a may be adjusted without affecting the voltage across lines 30a, 31a.

With reference now to FIG. 5 wherein the first, second and resultant signals are shown graphically during operational conditions when welding current is arcing, or flashing, between the workpieces W-1, W-2 of FIG. 4, it will be noted that with an assumed first signal voltage of 40 and a second signal voltage of 50, a resultant signal voltage of 10 in a direction to cause movement of the workpieces toward each as previously described will be produced. If, now, it is desired to reduce welding current voltage by an amount to provide a first signal voltage of, for example 20, as shown in FIG. 6, this may be done by actuating the variable resistor 60. With the first signal thus reduced in voltage, a proportionate reduction will occur in both the second and resultant signals thus slowing down workpiece movement but not otherwise effecting operation thereof. Similarly, an increase in voltage by operation of the variable resistor 60 would effect a proportional increase in the magnitude of the first, second and resultant signals with an accompanying increase in the rate of workpiece movement.

While the increase or decrease of welding current voltage by the variable resistor 60 provides a desirable increase or decrease of workpiece movement, such an expedient is not considered satisfactory where the change in voltage must be relatively large because by so varying the voltage, a resultant welding current wave pattern is produced which provides inferior welding results. It is, therefore, considered desirable to maintain the variable resistance 60 at an adjusted position of little or no resistance and to vary welding current voltage by changing the taps in the welding transformer primary 25a as will next be described.

Disregarding for the moment operation of transformer 61 and with reference to FIG. 7, if the welding transformer primary tap is changed to reduce welding current voltage by the same amount as represented in FIG. 6, it will be seen that while the second signal is reduced in voltage by the same amount as shown in FIG. 6, the first signal is unchanged. Accordingly, the resultant signal will be greater in voltage than desired and even worse, of the opposite polarity so that instead of the workpieces being moved together, they will be shifted apart thus rendering the apparatus inoperative.

Figure 8:
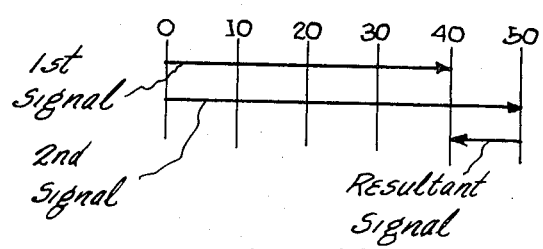

To obviate the foregoing, the tap selector of welding transformer 22a is connected to the tap selector of transformer 61 so that as the welding current is reduced, the second signal fed to the rectifier 32a along the lines 33a, 34a will be increased in the same proportion so that the voltage of the second signal relative to the first signal remains unchanged as illustrated in FIG. 8. Of course, if the welding transformer tap selector is employed to increase welding current voltage, the transformer 61 will simultaneously and proportionally reduce the voltage of the second signal so that its relationship with the first signal again remains unchanged.

FIG. 9 once again illustrates the condition wherein welding current is arcing between the workpieces and as arbitrarily shown, the first signal is of magnitude of 40 volts while the second signal is of a magnitude of 45 volts. This causes a resultant signal of 5 volts whose polarity is such that the workpieces are caused to move together.

Figure 9:
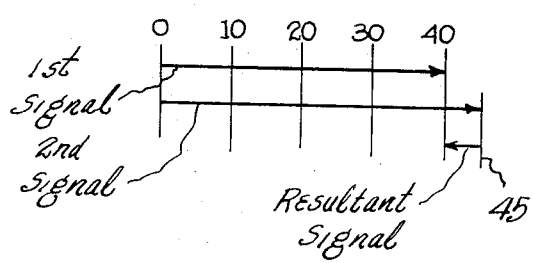
Figure 10:
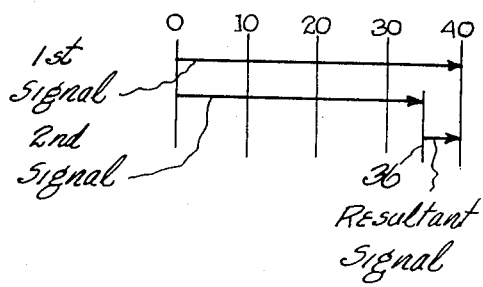

With reference to FIG. 10, it will next be assumed that the workpieces have been moved to engagement thus extinguishing the arc therebetween but that such pieces are not yet heated to welding temperature. It will also be assumed that upon workpiece engagement, the voltage of the second signal drops 20 percent from that seen in FIG. 9. A 20 percent drop in voltage of the second signal brings the magnitude of the latter to 36 volts causing a resultant signal of 4 volts whose polarity is such, since the second signal is lower in voltage than the first, that the workpieces will be moved apart. As the workpieces move apart, the arc therebetween will be re-established, the voltage of the second signal will rise to the level as seen in FIG. 9, and movement of the workpieces toward each other will be resumed.

While quite satisfactory operation results under conditions assumed in FIG. 10; that is, a 20 percent voltage drop of the second signal upon workpiece engagement from an initial arcing value of 45 volts prior to workpiece engagement, operation will differ markedly if the second signal voltage drops 10 percent, rather than 20, upon workpiece engagement.

Figure 11:
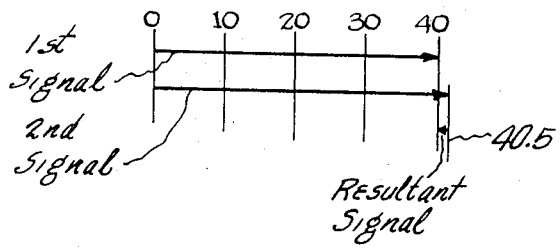
Figure 12:
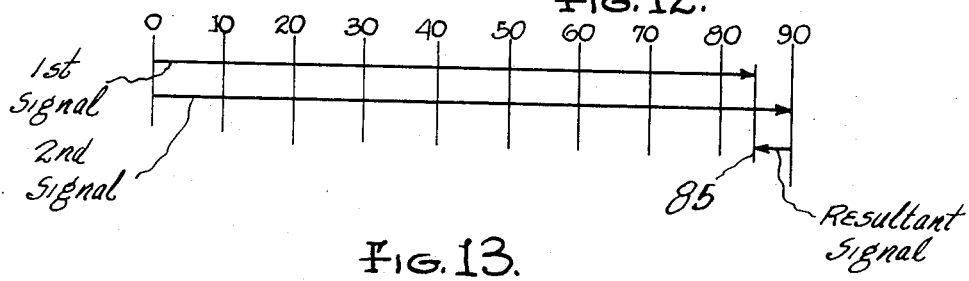
Figure 13:
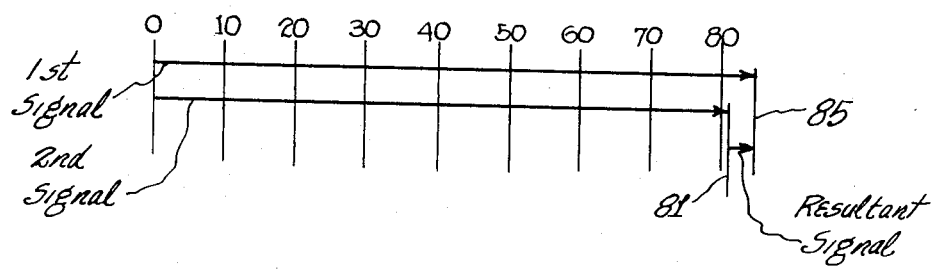

FIG. 11 illustrates a 10 percent drop in voltage of the second signal, upon workpiece engagement, from the arcing condition seen in FIG. 9. A 10 percent drop of voltage of the second signal from its initial voltage of 45 volts reduces the second signal to a voltage of 40.4 volts. The second signal is thus still .5 volt greater than the voltage of the first signal (causing a resultant signal of .5 volt) and therefore there will be no reversal of workpiece movement to cause the workpieces to separate and thereby re-establish the arc therebetween. Under such conditions, therefore, the apparatus would become inoperative. With a 10 percent drop in voltage in the second signal upon workpiece engagement rather than 20 percent drop therein it is necessary to increase the sensitivity of the apparatus as next will be described:

Turning now to FIG. 12, if the magnitude of both the first and second signals are simultaneously increased by operation of the variable resistances 64, 65 by an amount of 45 volts to 85 and 90 respectively, as shown in FIG. 12, the resultant signal, during arcing of the workpieces will be 5 volts and of a polarity to move the workpieces together (like FIG. 9). If it now be assumed that the workpieces engage and thus extinguish the arc before the workpieces are heated sufficiently for welding, the assumed 10 percent drop in the second signal will lower the voltage of the latter to 81 volts and the resultant signal will become 4 volts (like FIG. 10) and of a polarity to move the workpieces apart to re-establish the arc therebetween.

It will be understood that in the event sensitivity is to be decreased rather than increased as above described, variable resistances 64, 65 will be operated in a direction to simultaneously reduce the voltage of both the first and second signals by the same magnitude.

While no diagram has been shown illustrating the effect of the previously described variable resistance 66, it is to be understood that this device merely adjusts the voltage of the second signal, without affecting that of the first signal, so that the desired voltage differential for proper operation of valve 16a exists therebetween during arcing of the workpiece.

Although devices 60, 64, 65 and 66 have been described as variable resistances, the non-linear operating characteristics thereof may render them undesirable for certain applications. Accordingly, continuously variable auto transformers or like devices having more nearly linear operating characteristics may be substituted for any or all of the variable resistances aforesaid if desired.

We claim:

1. In a flash welder wherein welding current is caused to arc between a pair of closely positioned workpieces to raise their adjoining portions to welding temperature, wherein a welding transformer has primary windings connected to a source of electrical power and secondary windings connected to said workpieces whereby welding current induced in said secondary windings will pass between said workpieces, and wherein power means effects relative movement of such workpieces toward and away from each other, the improvement comprising means providing a first electrical signal whose voltage is proportional to the voltage applied to said welding transformer primary, means providing a second electrical signal whose voltage is proportional to the actual voltage between said workpieces, means for comparing said signals and for effecting operation of said power means to relatively move said workpieces toward each other when the voltage of said first signal is less than that of said second signal and to relatively move said workpieces away from each other when the voltage of said first signal is greater than that of said second signal, means for adjusting the voltage induced in said transformer secondary windings without affecting the voltage applied to said transformer primary windings, and means for adjusting the voltage of said second signal, the aforesaid means for adjusting being interconnected in inverse relation whereby an adjustment effecting an increase or decrease of the voltage induced in said transformer secondary windings results in a corresponding adjustment effecting a decrease or increase respectively of the voltage of said second signal to prevent a change of voltage of the latter caused by voltage adjustment of said transformer secondary windings.

2. In a flash welder wherein welding current is caused to arc between a pair of closely positioned workpieces to raise their adjoining portions to welding temperature, wherein a welding transformer has primary windings connected to a source of electrical power and secondary windings connected to said workpieces whereby welding current induced in said secondary windings will pass between said workpieces, and wherein power means effects relative movement of such workpieces toward and away from each other, the improvement comprising a first electrical circuit providing a first electrical signal whose voltage is proportional to the voltage supplied said welding transformer, a second electrical circuit providing a second electrical signal whose voltage is proportional to the actual voltage between said workpieces, means for comparing said signals and for effecting operation of said power means to relatively move said workpieces toward each other when the voltage of said first signal is less than that of said second signal and to relatively move said workpieces away from each other when the voltage of said first signal is greater than that of said second signal, and voltage changing means interposed between said transformer primary windings and its source of power aforesaid for varying the voltage across said transformer primary windings thus varying the voltage induced in said transformer secondary windings and the voltage of said second electrical signal, said first electrical circuit having a connection intermediate said transformer primary windings and said voltage changing means whereby adjustment of the latter to cause a change of voltage across said transformer primary windings effects a corresponding proportional change in said first electrical signal.

3. In a flash welder wherein welding current is caused to arc between a pair of closely positioned workpieces to raise their adjoining portions to welding temperature, wherein a welding transformer has primary windings connected to a source of electrical power and secondary windings connected to said workpieces whereby welding current induced in said secondary windings will pass between said workpieces, and wherein power means effects relative movement of such workpieces toward and away from each other, the improvement;

a first electrical circuit providing a first electrical signal whose voltage is proportional to the voltage supplied said welding transformer, a second electrical circuit providing a second electrical signal whose voltage is proportional to the actual voltage between said workpieces, means for comparing said signals and for effecting operation of said power means to relatively move said workpieces toward each other when the voltage of said first signal is less than that of said second signal and to relatively move said workpieces away from each other when the voltage of said first signal is greater than that of said second signal, means in circuit with said first and second electrical circuits for simultaneously increasing or decreasing power gain of said signals in like magnitude to said power means, and means in circuit with said second electrical circuit for increasing or decreasing the driving power of said second electrical signal to thereby increase or decrease the driving power of said power means.

4. In a flash welder wherein welding current is caused to arc between a pair of closely positioned workpieces to raise their adjoining portions to welding temperature, wherein a welding transformer has primary windings connected to a source of electrical power and secondary windings connected to said workpieces whereby welding current induced in said secondary windings will pass between said workpieces, and wherein a motor means effects relative movement of such workpieces toward and away from each other, the improvement comprising;

a first circuit in electrical circuit with the line applying voltage to said welding transformer primary, including a first rectifier, a second circuit with the line applying voltage between said workpieces, including a second rectifier, a pair of fixed resistances connected in series, one end of the series connection being connected to one side of the output of said first rectifier and the other end of said series connection being connected to a similar side of the output of said second rectifier, and the midpoint of said series connection being connected to the other sides of the outputs of said rectifiers, and the ends of said series connection being connected in series with a driving coil which effects actuation of said motor means, the foregoing providing a first electrical signal in said first circuit whose voltage is proportional to the voltage applied to said welding transformer and a second electrical signal in said second circuit whose voltage is proportional to the actual voltage between said workpieces, and means for comparing said first and second electrical signals and for effecting current flow in said driving coil in one direction to thereby move said motor means to effect relative movement of said workpieces toward each other when the voltage of said first signal is less than that of said second signal, and for effecting current flow in said driving coil in an opposite direction to thereby move said motor means to effect relative movement of said workpieces away from each other when the voltage of said first signal is more than that of said second signal, means affecting said first and second circuits for simultaneously increasing or decreasing their power gains in like magnitude to said driving coil, and means affecting said second circuit for increasing or decreasing the driving power of said second signal and thereby increasing or decreasing the driving power to said driving coil.

References Cited

UNITED STATES PATENTS

| 2,939,065 | 5/1960 | Matulaitis | 219—69 X |
| 3,068,350 | 12/1962 | Archer | 219—110 |
| 3,167,632 | 1/1965 | O'Connor | 219—69 |
| 2,727,969 | 12/1955 | Platte | 219—100 X |
| 2,882,437 | 4/1959 | McKechnie | 219—69 X |

FOREIGN PATENTS

| 693,189 | 7/1940 | Germany. |
| 475,238 | 11/1937 | Great Britain. |

RALPH F. STAUBLY, Primary Examiner

U.S. Cl. X.R.

219—69, 100, 110, 131; 314—63